Oct. 15, 1929.　　　E. E. DRUMM　　　1,732,003

DETACHABLE COOKING UTENSIL HANDLE

Filed Sept. 4, 1928

Inventor
E. E. Drumm
By Young & Young
Attorneys

Patented Oct. 15, 1929

1,732,003

UNITED STATES PATENT OFFICE

ELMER E. DRUMM, OF MANITOWOC, WISCONSIN, ASSIGNOR TO ALUMINUM GOODS MFG. CO., OF MANITOWOC, WISCONSIN

DETACHABLE COOKING-UTENSIL HANDLE

Application filed September 4, 1928. Serial No. 303,795.

This invention pertains to cooking utensils, and more particularly to a novel structure of detachable handle therefor.

The primary object of the present invention resides in the provision of a simple and comparatively inexpensive, detachable handle, capable of rigid attachment to a utensil at different angles, to facilitate its use in either restricted or unconfined spaces, and to permit a change of leverage in raising the utensil by the handle.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

Figure 1:
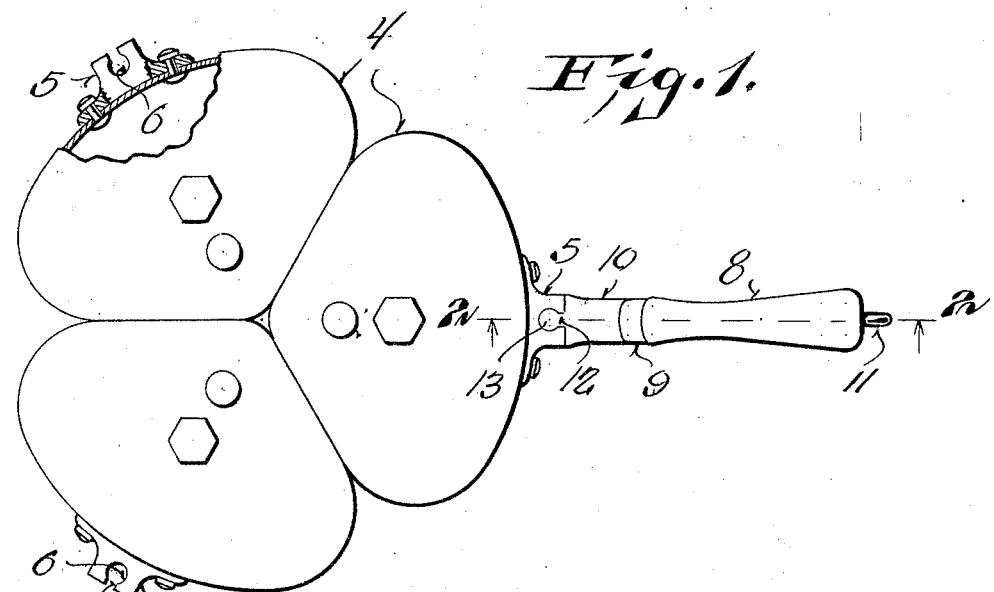
Figure 1 is a plan view of a nest of utensils constructed in accordance with the present invention.

Referring now more particularly to the accompanying drawings, the novel structure of handle, comprising the essence of the present invention, is illustrated in connection with a plurality of nested cooking utensils 4, but it is to be understood that the specific structure of vessel forms no part of the present invention, inasmuch as the handle may be employed with various types and sizes of vessels.

Secured to the outer side wall of each of the vessels 4 is a socket member 5, provided with a conical, vertical aperture 6 extending entirely through the socket member and tapering outwardly towards the bottom of the same. Connecting the aperture with the front side of the socket member is a vertical slot 7 to receive the handle in a manner to be hereinafter described.

The detachable handle may be of any conventional structure, but for the purpose of illustration, the showing in the drawing comprises a grip portion 8, preferably made of a non-conductive material to avoid excessive heating and burning of the hands.

Secured to the inner end of the grip portion is a heat insulating member 9 to which is secured an attaching block 10. The foregoing structure is not novel and therefore forms no specific part of the present invention, other than in the combination hereinafter claimed. A bolt 11 serves to lock the grip 8, insulating member 9, and attaching block 10, as best illustrated in Figure 2.

The attaching block 10 is provided with a pair of webs 12 extending at approximately right angles to one another, one of said webs being substantially parallel to the longitudinal axis of the handle. Carried by each of the webs 12 is a conical lug 13, which in operation is inserted into the vertical aperture 6 formed in the socket member 5. The slot 7 connecting the aperture 6 with the front face of the socket member, receives the webs 12 to prevent turning of the handle in the socket.

Figure 2:
Figure 2 is a detail sectional view taken on the line 2—2 of Figure 1, with the handle shown in substantially vertical position.
Figure 3:
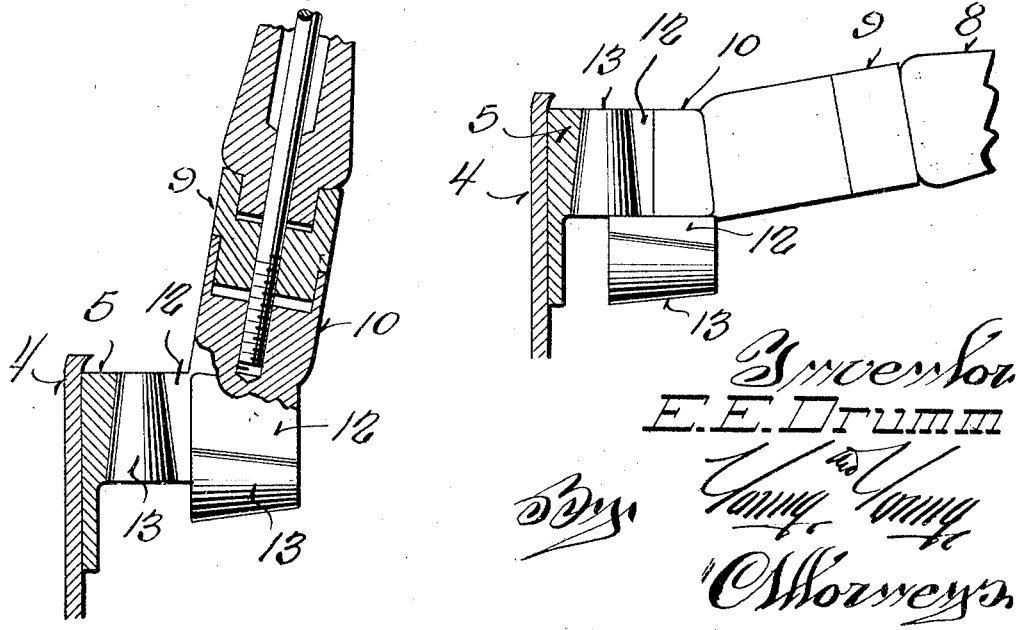
Figure 3 is a fragmentary detail with parts in section, illustrating the handle in substantially horiontal position.

From the foregoing it will be readily seen that the handle may be assembled in the socket member either in a substantially vertical position, as shown in Figure 2, or a horizontal position, as shown in Figure 3, depending upon the lug inserted into the socket member.

As set forth in the objects of the invention, where the utensils are placed in a confined position, the handle is vertically attached to the utensil, whereas in other instances, the handle may be attached in the usual horizontal manner.

The advantages of the present invention will be apparent, inasmuch as the detachable handle avoids burning or excessive heating of the same from the flame over which the utensil may be placed. Varying the angle of attachment of the handle permits its use in confined or unconfined spaces, and at the same time permits a maximum or minimum leverage to be obtained in lifting the vessel by the handle.

It will also be appreciated that the attaching block may be constructed at practically no additional cost over the conventional types of handles, and that the same may be secured to various types of conventional grips now in use.

I claim:—

1. The combination of a utensil, a socket member carried by said utensil and provided with a vertical aperture tapered outwardly toward the bottom of said socket, and a restricted slot between said aperture and the front of said member, a handle, an attaching block removably connected to one end of said handle a pair of webs carried by said block and projecting therefrom at an angle to one another, and conical lugs carried by said webs for engagement in the vertical aperture in said socket member.

2. In a handle for cooking utensils, a gripping portion, an attaching block removably secured to one end of the grip portion, a pair of webs at the outer end of said block and projecting therefrom at right angles to each other, and conical lugs carried by said webs with their larger ends adjacent one another.

In testimony that I claim the foregoing I have hereunto set my hand at Manitowoc, in the county of Manitowoc and State of Wisconsin.

ELMER E. DRUMM.